United States Patent
Sethi et al.

(10) Patent No.: US 10,972,279 B2
(45) Date of Patent: Apr. 6, 2021

(54) EFFICIENT VALIDATION FOR BLOCKCHAIN

(71) Applicant: International Business Machines Corporation, Armonk, NY (US)

(72) Inventors: Manish Sethi, Cary, NC (US); David M. Enyeart, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 16/002,150

(22) Filed: Jun. 7, 2018

(65) Prior Publication Data

US 2019/0379543 A1 Dec. 12, 2019

(51) Int. Cl.
*H04L 29/06* (2006.01)
*H04L 9/32* (2006.01)

(52) U.S. Cl.
CPC ........ *H04L 9/3236* (2013.01); *H04L 2209/38* (2013.01)

(58) Field of Classification Search
CPC .... H04L 2209/38; H04L 9/0636; G06F 16/27
See application file for complete search history.

(56) References Cited

U.S. PATENT DOCUMENTS

| | | |
|---|---|---|
| 2016/0292672 A1 | 10/2016 | Fay et al. |
| 2017/0005804 A1 | 1/2017 | Zinder |
| 2017/0132626 A1 | 5/2017 | Kennedy |
| 2017/0180134 A1 | 6/2017 | King |
| 2017/0243193 A1 | 8/2017 | Manian et al. |
| 2017/0295023 A1 | 10/2017 | Madhavan et al. |
| 2017/0301047 A1 | 10/2017 | Brown et al. |
| 2017/0323392 A1 | 11/2017 | Kasper et al. |
| 2017/0345011 A1* | 11/2017 | Salami ................. G06Q 20/42 |
| 2018/0089436 A1* | 3/2018 | Smith ................... H04L 9/3236 |
| 2018/0121909 A1 | 5/2018 | Christidis et al. |
| 2018/0152289 A1 | 5/2018 | Hunt et al. |
| 2018/0276626 A1* | 9/2018 | Laiben ............... G06Q 20/0658 |
| 2019/0268141 A1* | 8/2019 | Pandurangan .......... G06F 21/76 |

FOREIGN PATENT DOCUMENTS

WO 2017109140 A1 6/2017

OTHER PUBLICATIONS

G. Pîrlea, "Mechanising blockchain consensus." Proceeding CPP 2018 Proceedings of the 7th ACM SIGPLAN International Conference on Certified Programs and Proofs, pp. 78-90, Los Angeles, CA, USA—Jan. 8-9, 2018.
Hyperledger, "Hyperledger-fabricdocs Documentation," Release master, Dec. 23, 2017.https://readthedocs.org/projects/hyperledger-fabric/downloads/pdf/latest/.

(Continued)

*Primary Examiner* — Jason K Gee

(57) ABSTRACT

An example operation may include one or more of creating, by a blockchain node, a validation database in a memory, simulating each of one or more transactions, determining that each transaction in a new block may be validated using the validation database, validating each transaction in the new block using the validation database, and committing the new block to the blockchain. The validation database includes data corresponding to a predetermined number of most recent blocks of a state database for a blockchain.

17 Claims, 11 Drawing Sheets

(56) References Cited

OTHER PUBLICATIONS

IBM Cloud Docs, "IBM Blockchain Platform, Hyperledger Fabric," https://console.bluemix.net/docs/services/blockchain/reference/v10_fabric.html#hyperledger-fabric2017-07-21 [Accessed Dec. 25, 2017].
L. Rao, "Efficient Path Characteristics Orchestration for Blockchain Applications." IP.com Disclosure No. IPCOM000250842D. Publication Date: Sep. 8, 2017.
M. Scherer, "Performance and Scalability of Blockchain Networks and Smart Contracts," Spring 2017, Master of Science Programme in Computing Science and Engineering, Umea University, Sweden.
M. Sethi, "Next Ledger Architecture Proposal," https://github.com/hyperledger-archives/fabric/wiki/Next-Ledger- Architecture-Proposal Jul. 12, 2016 [Accessed Dec. 25, 2017].
R. Dennis, "A Temporal Blockchain: A Formal Analysis," 2016 International Conference on Collaboration Technologies and Systems (CTS), Orlando, FL, 2016, pp. 430-437.
T. McConaghy, "BigchainDB: A Scalable Blockchain Database." Online. Jun. 8, 2016 2016. https://www.bigchaindb.com/whitepaper/bigchaindb-whitepaper.pdf [Accessed Dec. 25, 2017].
E. Androulaki, "Hyperledger Fabric: A Distributed Operating System for Permissioned Blockchains." (Submitted on Jan. 30, 2018) https://arxiv.org/abs/1801.10228.
International Search Report and Written Opinion issued in the corresponding International Application No. PCT/EP2019/06295, dated Jul. 24, 2019.

\* cited by examiner

EFFICIENT VALIDATION FOR BLOCKCHAIN

TECHNICAL FIELD

This application generally relates to transaction validation for blockchain networks, and more particularly, to efficient validation for a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in a blockchain's blocks, which are secured from tampering and revision due to their immutable properties. Each block contains a timestamp and a link to a previous block. A blockchain can be used to hold, track, transfer and verify information. Since a blockchain is a distributed system, before adding a transaction to a blockchain ledger, all peers need to reach a consensus status.

Conventionally, blockchain transactions are validated against a state database for all blocks in a blockchain, which is limited by the time it takes to retrieve the state data from the database. As such, what is needed is a faster and more efficient form of transaction validation to overcome these limitations.

SUMMARY

One example embodiment may provide a method that includes one or more of creating, by a blockchain node, a validation database in a memory, simulating each of one or more transactions, determining that each transaction in a new block may be validated using the validation database, validating each transaction in the new block using the validation database, and committing the new block to the blockchain. The validation database includes data corresponding to a predetermined number of most recent blocks of a state database for a blockchain.

Another example embodiment may provide a system that includes a processor and memory, wherein the processor is configured to perform one or more of simulate each of one or more transactions, determine that each transaction in a new block may be validated using the validation database, validate each transaction in the new block using the validation database, and commit the new block to the blockchain.

A further example embodiment may provide a non-transitory computer readable medium comprising instructions, that when read by a processor, cause the processor to perform one or more of creating, by a blockchain node, a validation database in a memory, simulating each of one or more transactions, determining that each transaction in a new block may be validated using the validation database, validating each transaction in the new block using the validation database, and committing the new block to the blockchain. The validation database includes data corresponding to a predetermined number of most recent blocks of a state database for a blockchain.

DETAILED DESCRIPTION

Figure 1A:
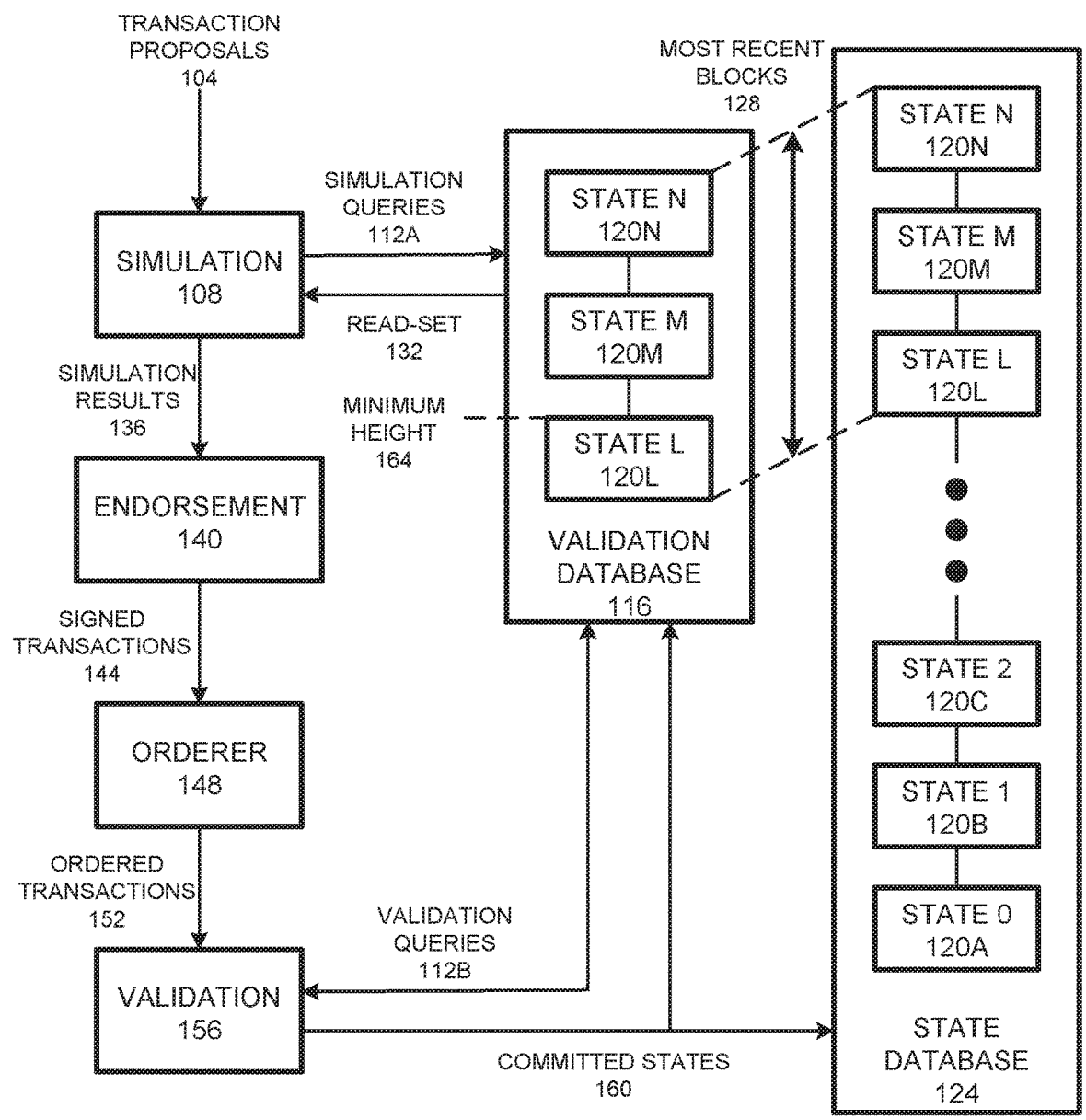
FIG. 1A illustrates a network diagram of a system for efficiently validating transactions with a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling. Example embodiments provide methods, systems, non-transitory computer readable media, devices, and/or networks, which provide efficient transaction validation for a blockchain.

A blockchain is a distributed system, which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members, and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database 124. The state database 124 may be simply an indexed view into the chain's transaction log, it can therefore be regenerated from the chain at any time. The state database 124 may automatically be recovered (or generated if needed) upon peer node startup, and before transactions are accepted.

The example embodiments are directed to methods, devices, networks, non-transitory computer readable media and/or systems, which support a blockchain solution that supports rapid transaction validation. Some of the benefits include providing a new solution for validating the transactions in a new block. In any blockchain, when a new block is published to the network, performing the validation of the transactions is a crucial step. This step eventually decides which transactions in the block are to be accepted as valid or invalid. The result of the validation, in turn, decides how the state of the blockchain mutates when the block is committed. The performance of this validation step has a direct influence on the overall throughput of transactions that a blockchain network can offer. The present application enables performance improvement to this validation step in blockchain technologies that are generic in nature and implement the execute/endorse/order/commit paradigm (such as Hyperledger Fabric).

When validation is performed, the state of the art during the commit phase is to access the state database (which is stored on disk and potentially could be very large in size). The present application presents a new technique that improves the efficiency and performance of the validation process by maintaining only a limited amount of data in a new validation database. This technique requires maintaining a limited amount of data that corresponds to a predetermined number of most recent blocks in the validation database, irrespective of the actual number of blocks in the blockchain (which keeps growing with time). Because of this limited amount of data, the validation database can be maintained potentially in-memory instead of on disk and hence avoids accessing the slower storage media for validation.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the validation database is implemented as an improvement to blockchain technology generally, and all blockchain networks will benefit from faster transaction validations.

One of the benefits of the example embodiments is an improvement of the functionality of a computing system by improving transaction validation performance and efficiency. Through the blockchain solution described herein, a computing system can perform novel functionality by maintaining the validation database in-memory. This will reduce significantly the amount of the data that blockchain nodes maintain for performing validation of transactions in a new block.

The example embodiments provide numerous benefits over a traditional database. For example, various advantages are achieved by improving transaction validation performance in blockchains. For example, more transactions may be validated per unit of time without increasing network speed/performance or blockchain node hardware. Also, such performance increase may be achieved without adding cost to a blockchain network by substituting faster blockchain node or networking hardware. The improvement provided by the present application is transparent to existing blockchain networks.

Meanwhile, a traditional database could not be used to implement the example embodiments because the improvements described herein are inherent to blockchain technology and blockchain infrastructure. Accordingly, the example embodiments provide for a specific solution to a problem in the arts/field of efficient validation for blockchains.

FIG. 1A illustrates a logic network diagram of a system for efficiently validating transactions with a blockchain, according to example embodiments. In many blockchain systems, during a block commit, transaction validation is one of the performance bottlenecks. This is primarily because the validation process causes a significant number of random reads to the database for validating the transactions against the current state of the database. This reflects the currently implemented validation scheme in Hyperledger Fabric. The present application introduces systems and methods that makes this validation process much more efficient by allowing the validation to be performed against a much smaller data set—which can be maintained in-memory and hence avoid accessing disk or slower primary storage.

Blockchain transactions include a sequence of queries and update statements enclosed in a boundary marked by statements 'begin_tran' and 'commit_tran'. The statement 'begin_tran' is equivalent to the start of simulation of a transaction and the statement 'commit_tran' is equivalent to validation and commit of the transaction. However, because of distributed nature of blockchains, the simulation is performed at one or more nodes and validation and commit is performed on all the nodes. During a lifetime of a transaction (i.e., between 'begin_tran' and 'commit_tran'—which is 'simulation' and 'commit', respectively), if the transaction performs a query more than once, the query results should not change. This is referred to as a serializable transaction isolation level. However, if some other transaction makes a data change between the 'begin_tran' and 'commit_tran' of the first transaction, the first transaction may receive different results for the same query. For a second query, it will receive an additional entry, where the additional entry is referred to as a phantom entry.

Referring to FIG. 1A, the network 100 includes a state database 124, which stores the current state 120 for all blocks in a blockchain. FIG. 1A illustrates a blockchain including state 0 120A, state 1, 120B, state 2 120C, through state L 120L, state M 120M, and state N 120N. Thus, there are N states 120 for the illustrated blockchain. For each state 120, there is a corresponding block (not shown), where blocks store validated transactions, and states 120 store a collection of tuples <key, value> for all the unique keys where 'key' represents a key present in any of the write-sets in any of the blocks and the 'value' represents the value present in the most recent occurrence of the key in a valid transaction (that contains the write-set) in the blockchain. For example, if a key 'balance' is present in three valid transactions in different blocks (say in block #1 as <'balance A':30>, in block #20 as <'balance B':50>, and in block #45 as <'balance C':70>), in the state database 124 the key 'balance' may appear only once with the value 70 (from the most recent block).

The network 100 also includes a validation database 116, which stores a subset of the state database 124. The subset corresponds to a predetermined number of most recent blocks 128. FIG. 1A illustrates a validation database 116 storing state information for state L 120L, state M 120M, and state N 120N. Thus, in the example illustrated, there are three states 120 shown in the validation database 116. It should be generally understood there are an equal number of blocks (not shown) to states 120. In a practical embodiment there are generally many more than three states 120 in the validation database 116—such as 100 states 120. The predetermined number of blocks corresponding to the validation database 116 depends on many factors, including performance of the blockchain network or network 100, a number of transactions in blocks, and size and performance of a memory used to store states 120 in the validation database 116.

The validation database 116 includes state changes 120 caused by the last few blocks, and during validation 156 the blockchain network verifies the state changes caused (by other committed transactions 160) since the simulation 108 of a transaction 104 could not have affected the results of the queries 112A performed by the transaction 104 during its simulation 108. Associated with the validation database 116 is a minimum height 164, which is a marker that identifies the position of an oldest block 120 within the validation database 116. In FIG. 1A, the minimum height 164 currently corresponds to state L 120L and is adjusted upward as more blocks are added to the blockchain and states 120 are added to the state database 124.

In a traditional blockchain validation arrangement (such as implemented in Hyperledger Fabric), during validation of the transactions present in a block, the queries (performed by the transactions during simulation) are executed against the state database 124 to verify that the results are same. In contrast, the present application maintains in memory a significantly smaller data set (the validation database 116) in order to perform the validation efficiently.

The transaction proposals 104 are executed by simulation 108 as simulation queries 112A against the state database 124. During simulation 108, transactions are executed fully but any changes to the state database 124 are not committed. Instead, they are recorded and bundled in a binary form. This is referred as a read-write set. A read set contains the information about the data items that were read by the transaction and the queries that were performed by the transaction. A write set contains information about the data items that the transaction wants to update.

The state database 124 provides a read-set 132 to simulation 108, which temporarily stores simulation results 136 for later validation. In one embodiment, the validation database 116 is provided in blockchain node memory, rather than disk or other mass storage. In another embodiment, the validation database 116 is provided in a blockchain node SSD memory (solid state disk), rather than disk or other mass storage.

Each participating blockchain node endorses the simulated transactions 136 by signing the transactions 144. The signed transactions 144 are transferred to an orderer 148, which puts the signed transactions 144 in execution order. Next, the ordered transactions 152 are sent to blockchain nodes performing validation 156. During validation 156, validation queries 112B are presented to the validation database 116. The validation database 116 responds with results including version numbers for all data items. The results are compared with the simulation results 136. If they match, then the validation is successful, the ordered transactions 156 are grouped within new blocks (not shown), and the new states become committed states 160.

When a new block 120 is committed to the blockchain, it is added to the state database 124 as a newest block 120, which corresponds to state O 120O in FIG. 1A. The new state 120 is also added to the validation database 116 as state O 120O after deleting the oldest state (state L 120L). The minimum height 164 is adjusted to reflect state M 120M as the oldest state 120 in the validation database 116, instead of state L 120L.

Figure 1B:
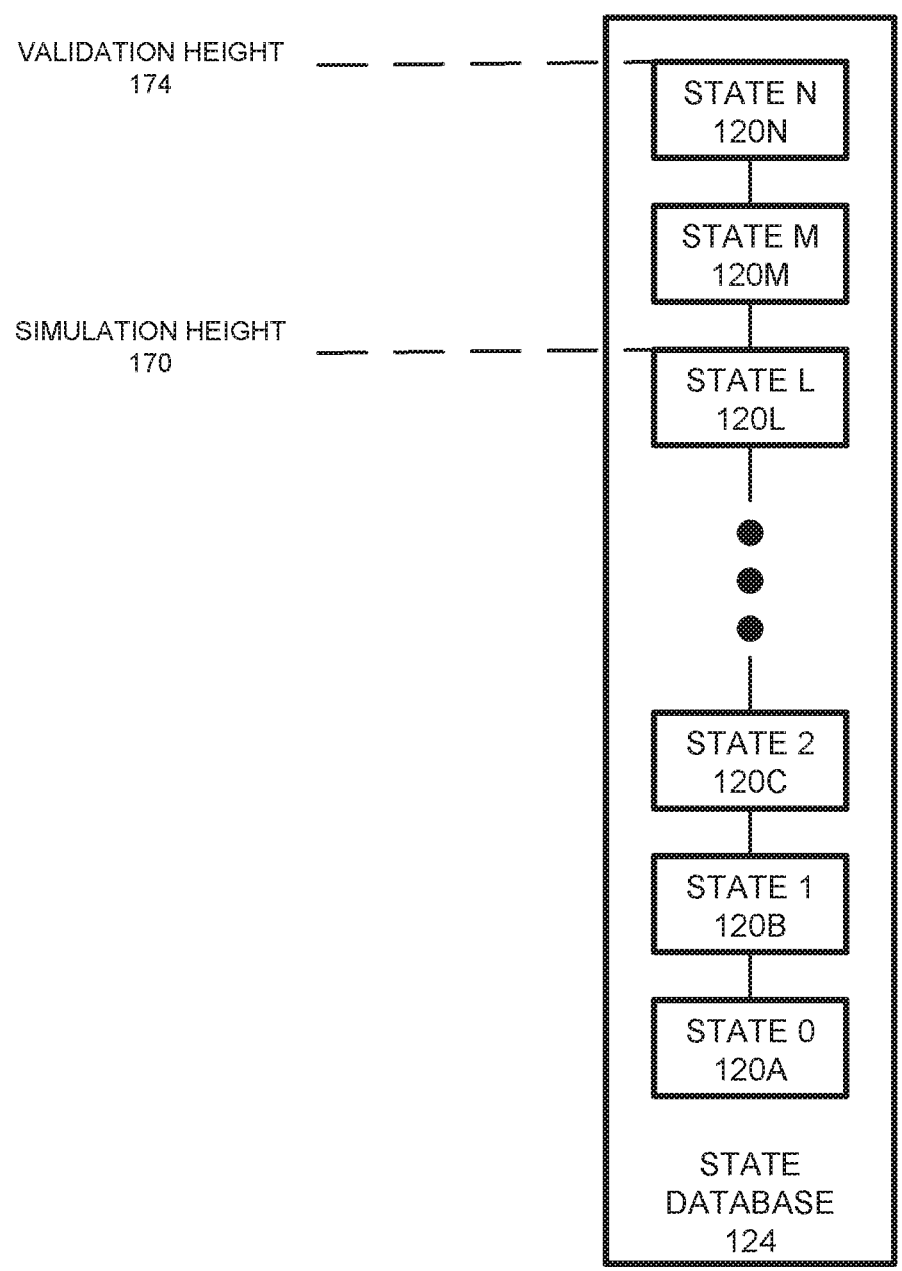
FIG. 1B illustrates a network diagram of state database parameters with a blockchain, according to example embodiments.

FIG. 1B illustrates another logic network diagram of state database parameters with a blockchain, according to example embodiments. Referring to FIG. 1B, the network 100 includes a state database 124, which includes the state 120 corresponding to each block in the blockchain. During simulation 108, a simulation height 170 is determined by each simulating blockchain node by observing the latest state 120 in the state database 124. In the example illustrated in FIG. 1B, the simulation height 170 corresponds to state L 120L.

At a later time, transactions for the new block are validated. As part of validation, a validation height 174 is determined by each validating blockchain node, again by observing the latest state 120 in the state database 124. In the example illustrated in FIG. 1B, the validation height 174 corresponds to state N 120N. Since validation occurs some time following simulation, additional blocks may have been committed to the blockchain, with more corresponding states 120 in the state database 124. Therefore, as shown in FIG. 1B, there are N states 120N in the state database 124 during validation, but L states 120L during simulation.

Figure 2A:
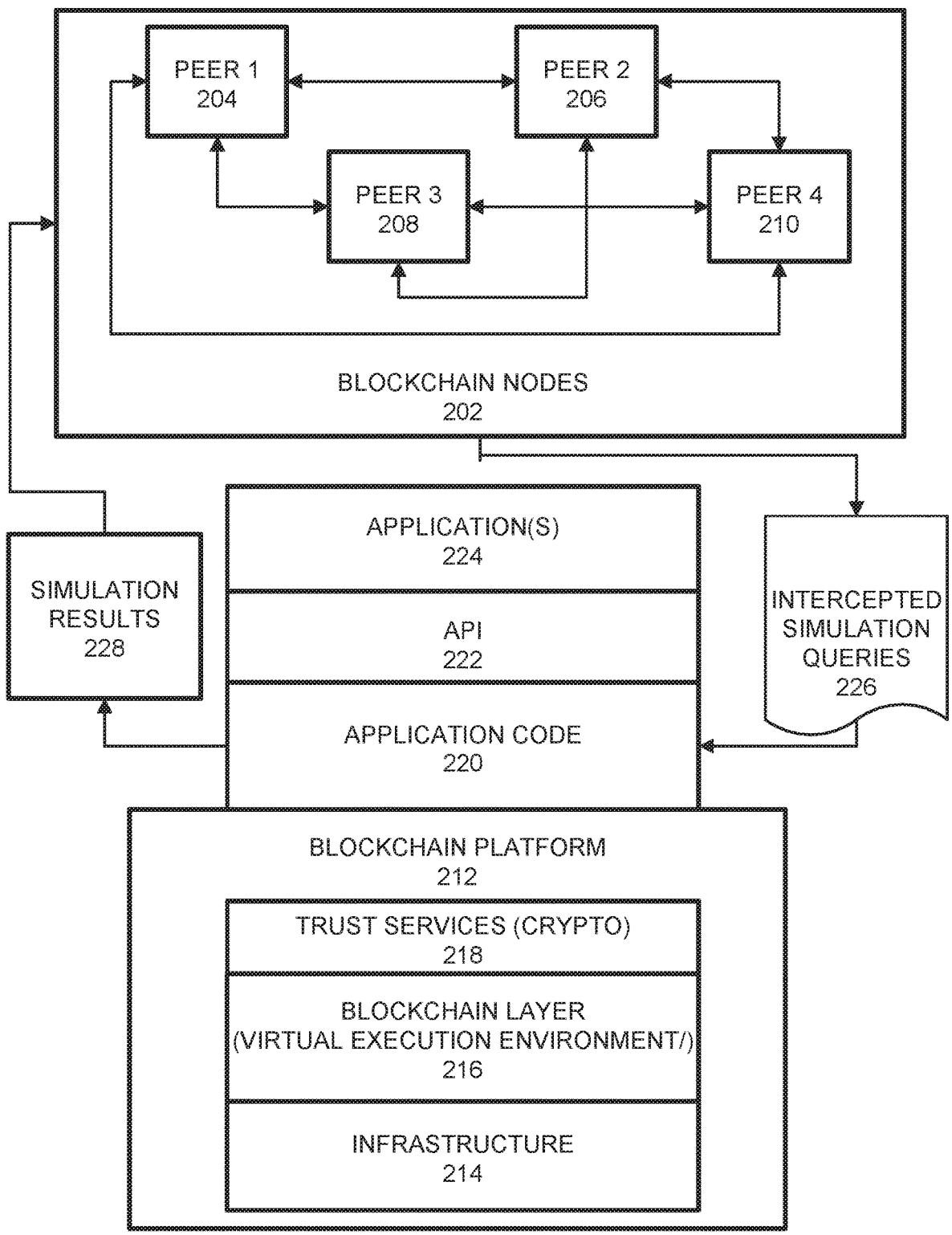
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, intercepted simulation queries 226 may be processed by one or more processing entities (e.g., virtual machines) included in the blockchain layer 216. The simulation results 228 may include a simulation height 170 of a state database 124. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, simulation queries to the state database 124 are intercepted in box 226. One function may be to provide simulation results, including a simulation height in box 228, which may be provided to one or more of the nodes 204-210.

Figure 2B:
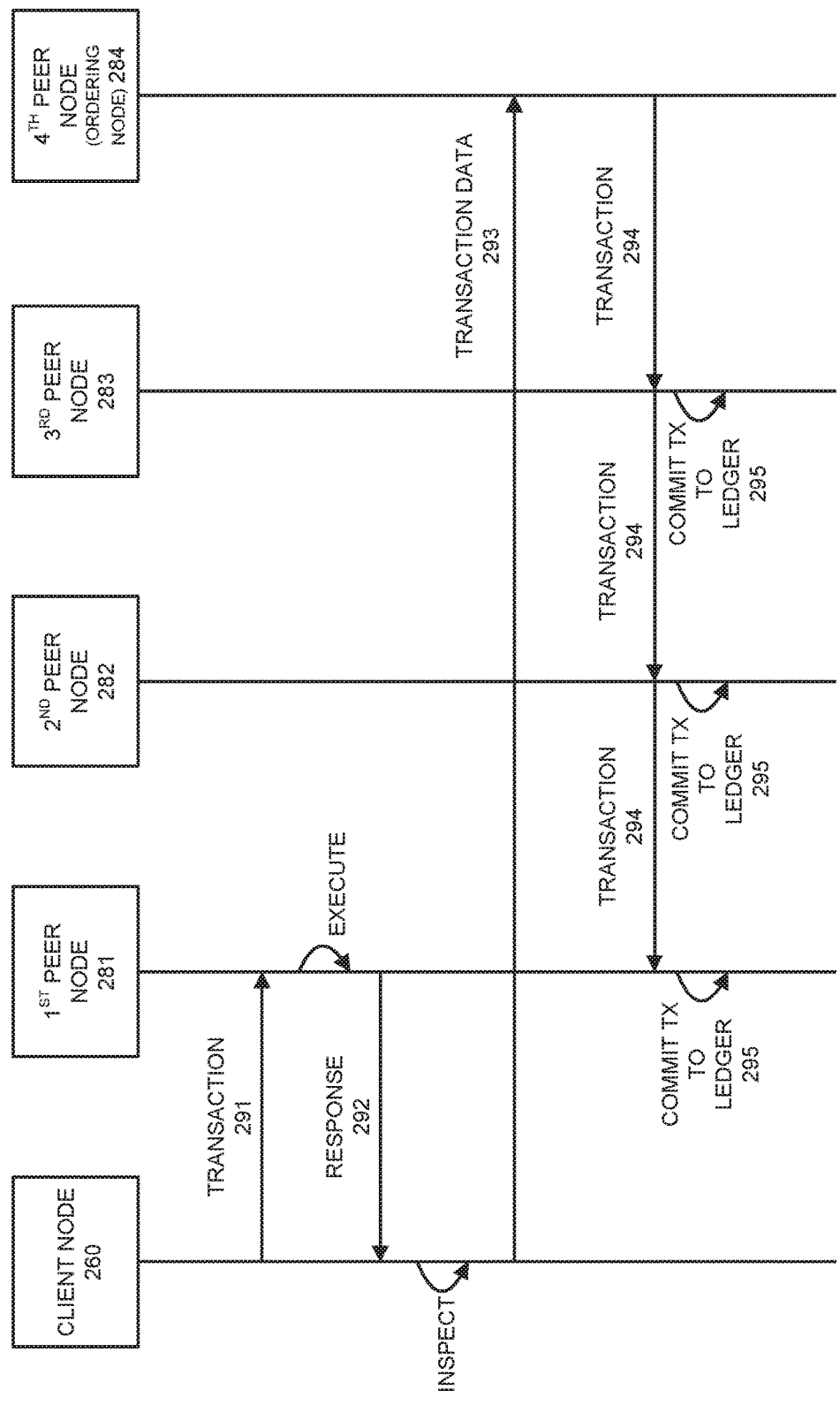
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/ verifies the endorsing peer's signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted to notify the client application that the transaction (invocation) has been immutably appended to the chain, as well as to notify whether the transaction was validated or invalidated.

Figure 3:
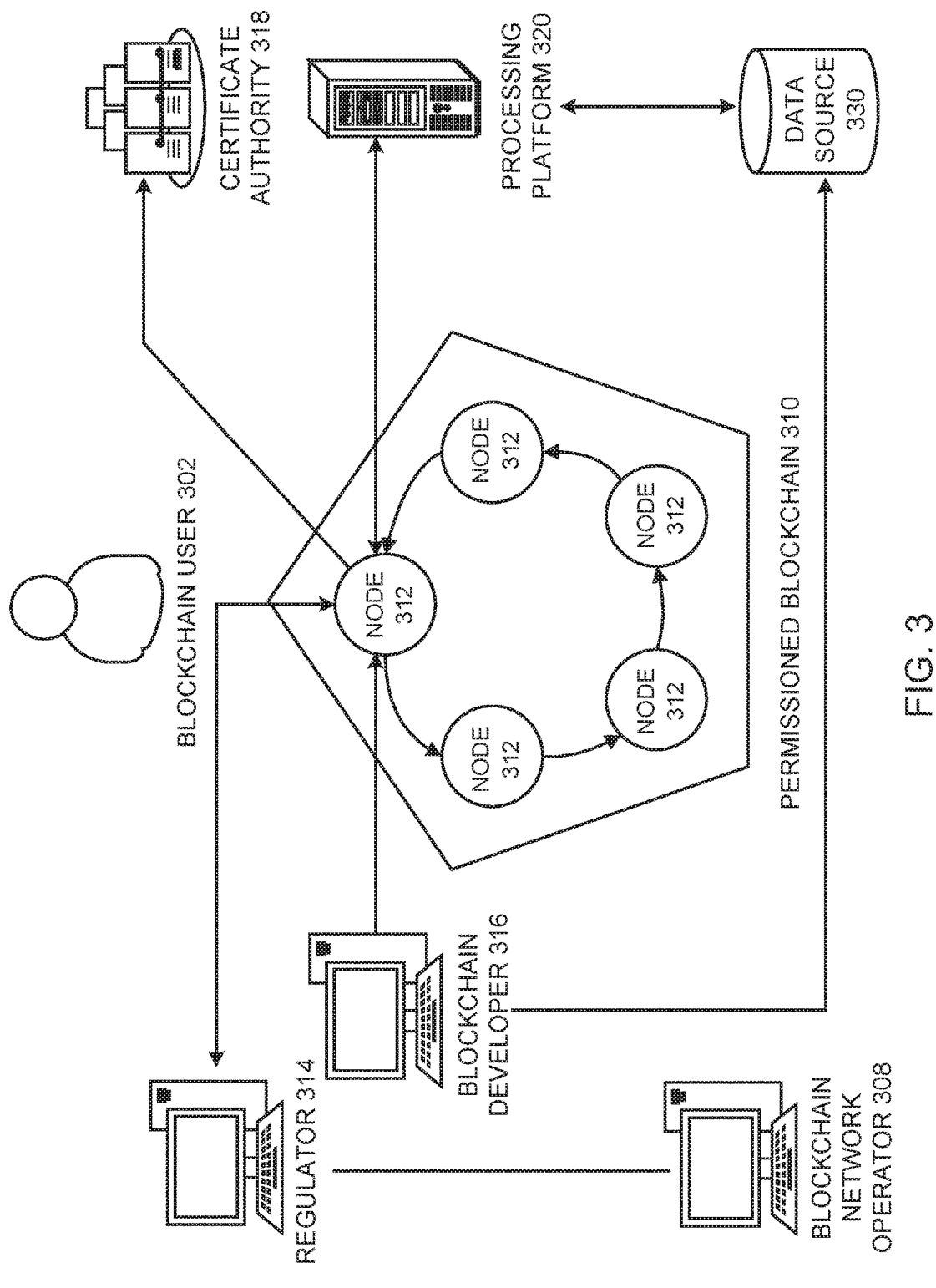
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
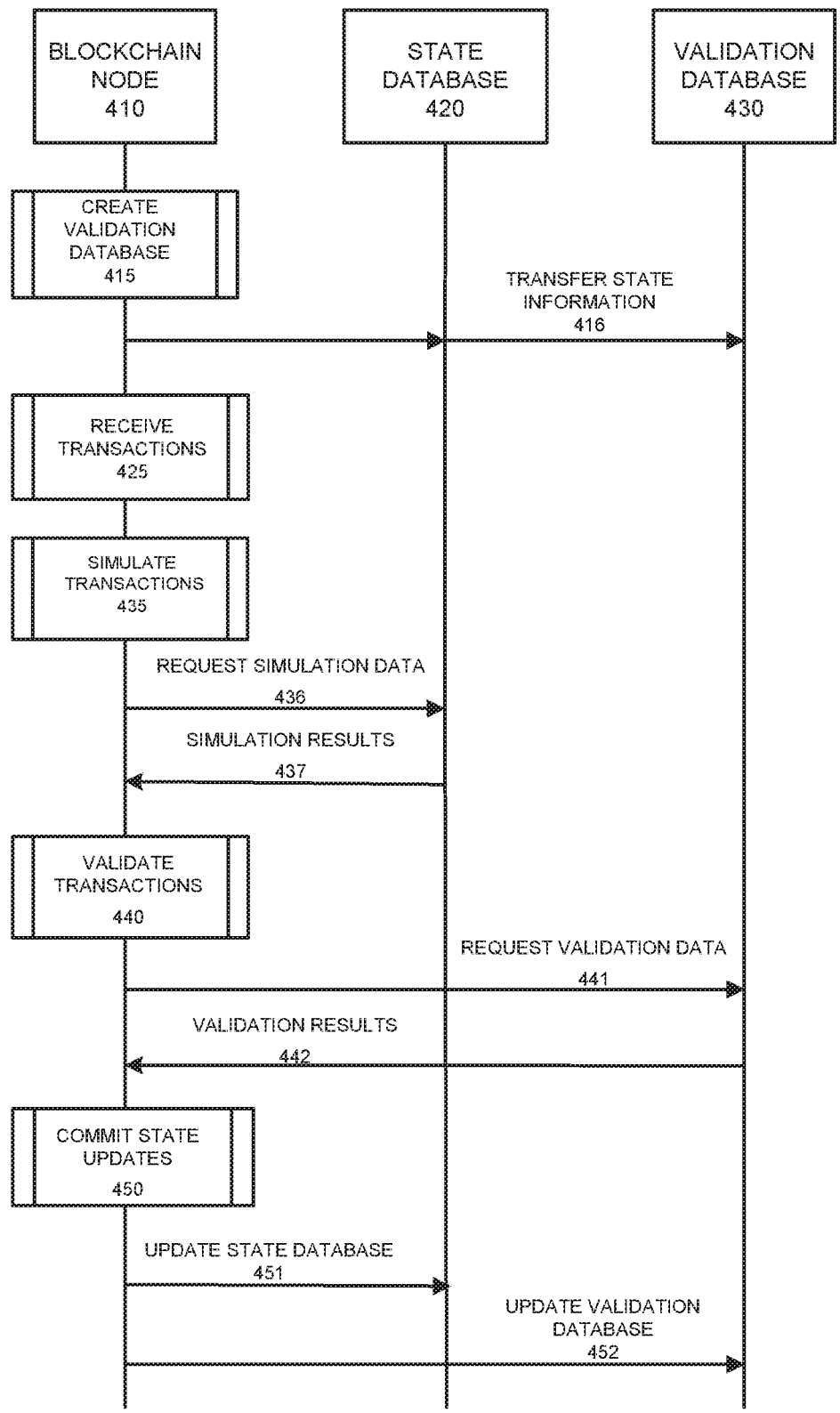
FIG. 4 illustrates a system messaging diagram for performing blockchain state simulation and validation, according to example embodiments.

FIG. 4 illustrates a system messaging diagram for performing blockchain state simulation and validation, according to example embodiments. Referring to FIG. 4, the system diagram 400 includes one or more blockchain nodes 410, a state database 420, and a validation database 430. The state database 420 is generally stored on disk-based storage devices accessed by the blockchain nodes 410, while the validation database 430 is generally stored on semiconductor-based storage devices, including system RAM or Solid-State Devices (SSDs) controlled by the blockchain nodes 410. Semiconductor-based storage devices are known to have faster performance characteristics than disk-based storage devices.

The blockchain node 410 first creates a validation database 430. State information is transferred 416 from the state database 420 to the validation database 430. The state information 416 corresponds to a predetermined number of most recent blocks for a blockchain. Once the validation database 430 has thus been established, the blockchain node 410 may receive blockchain transactions 425. The predetermined number of most recent blocks for the blockchain is a variable that depends on the amount of memory able to be allocated to the validation database 430, the performance of the memory, the performance of the state database 420 relative to the memory, and timing requirements that may be in effect for creating new blocks.

The validation database 430 includes a minimum height 164, which is a height of an oldest block (i.e. oldest state 120) having data available in the validation database 430. The blockchain node 410 determines that each transaction in a new block may be validated using the validation database 430 by verifying the simulation height of each transaction is greater than or equal to a minimum height 164 corresponding to data maintained in the validation database 430.

In response to receiving transactions 425, the blockchain node 410 simulates the transactions 435. Transactions are simulated when the blockchain node 410 intercepts queries 436 to the state database 420, and reviews simulation results 437 to the blockchain node 410. In one embodiment, the blockchain node 410 determines a height of the blockchain for each simulated transaction 435, where the blockchain height is the number of blocks in the blockchain at the time of simulation and sets a simulation height 170 as a minimum of the blockchain height. In another embodiment, the blockchain node 410 sets a simulation height 170 as a minimum blockchain height for multiple transactions. In another embodiment, the blockchain node 410 determines the height of the blockchain for each simulated transaction, and intercepts one or more queries to the state database 124 for each simulated transaction, obtains one or more data versions, and selects a maximum data version of the one or more data versions as the simulation height 170.

Next, the blockchain node 410 validates the transactions 440. The blockchain node 410 requests validation data 441 from the validation database 430, and validation database in response provides validation results 442. Validation 440 includes recording an identification of a state database snapshot during simulation 435 and detecting if there are differences in the state database 420 between simulation 435 and validation 440. During validation 440, the blockchain node 410 identifies phantom items in the state database 420, and records transactions as invalid in response to identifying one or more phantom items for the transactions. Phantom items are repeated items.

If the simulation results 437 are consistent with the validation results 442, the blockchain node 410 commits state updates to the blockchain. Transactions are stored to the blocks (not shown), the state database is updated 451, and the validation database is updated 452. The blockchain node 410 applies writes for valid transactions in the new block as updates to both the state database 420 and the validation database 430, deletes data corresponding to the oldest block in the validation database 430, and adjusts the minimum height 164 to reflect the blocks corresponding to data maintained in the validation database 430. Once the state database 420, validation database 430, and the blocks include the committed updates, the commit phase has been completed.

Figure 5A:
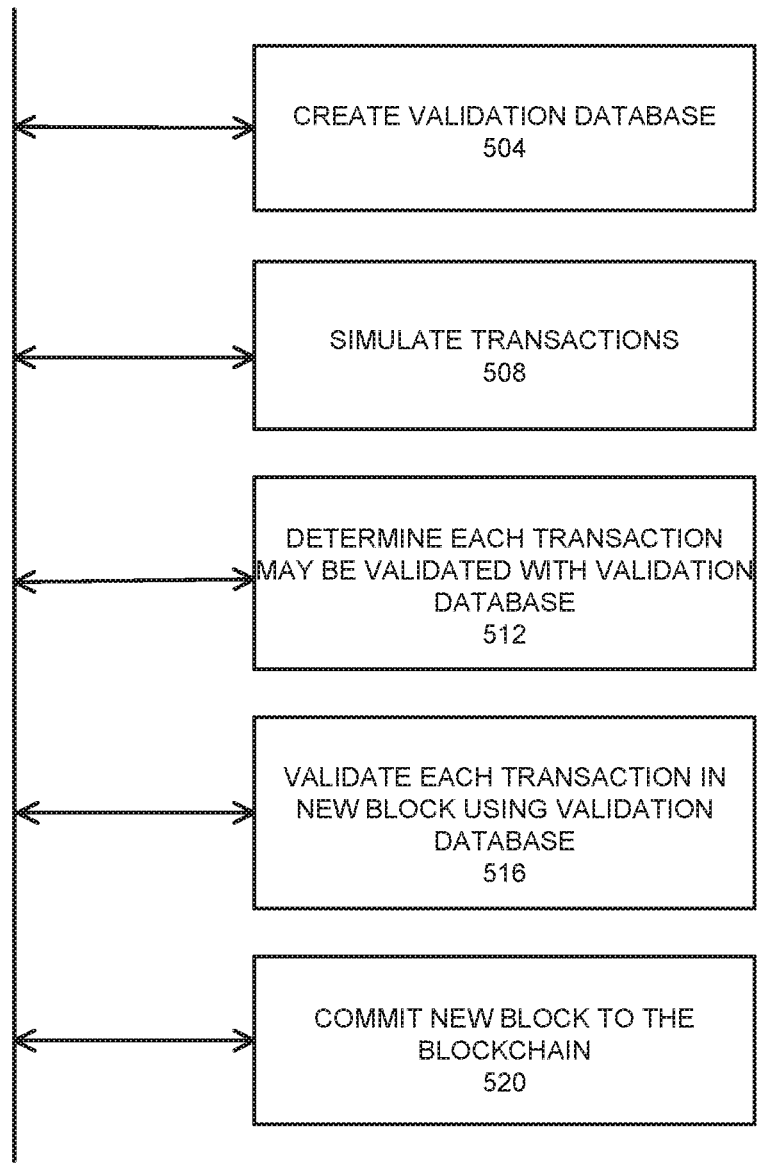
FIG. 5A illustrates a flow diagram of an example method of simulating and validating transactions using a validation database in a blockchain, according to example embodiments.

FIG. 5A illustrates a flow diagram 500 of an example method of simulating and validating transactions using a validation database in a blockchain, according to example embodiments. Referring to FIG. 5A, the method 500 may include one or more of the illustrated steps. At block 504, a blockchain node creates a validation database 116. The validation database 116 is created from the state database 124 for a blockchain and includes state information corresponding to a predetermined number of most recent blocks. The validation database 116 is stored in a faster memory than the state database 124, which results in faster transaction validation than conventional systems.

At block 508, received transactions are simulated by the blockchain node. Queries to the state database 124 are intercepted and information about data items is returned as a result of the queries. In one embodiment, a data item may include a simulation height for one or more transactions where the simulation height corresponds to the number of blocks in the blockchain at the time of the transaction simulation.

At block 512, the blockchain node determines each transaction may be validated using the validation database 116. This allows the validation database 116 to be used for transaction validation instead of the larger and slower state database 124, resulting in less transaction validation time.

At block 516, each transaction in a new block is validated using the validation database 116. In one embodiment, validation includes comparing a validation height 174 to a simulation height 170, where the validation height 174 corresponds to the number of blocks in the blockchain at the time of validation.

At block 520, the new validated block is committed to the blockchain. The state database 124 has a new state 120 appended corresponding to the new block. An oldest state 120 in the validation database is deleted while a new state 120 corresponding to the new block is added to the validation database 116. This maintains the validation database 116 as storing a number of states 120 corresponding to the predetermined number of most recent blocks. Finally, a minimum height 164 parameter is updated to reflect the height of the oldest state 120 in the validation database 116.

Figure 5B:
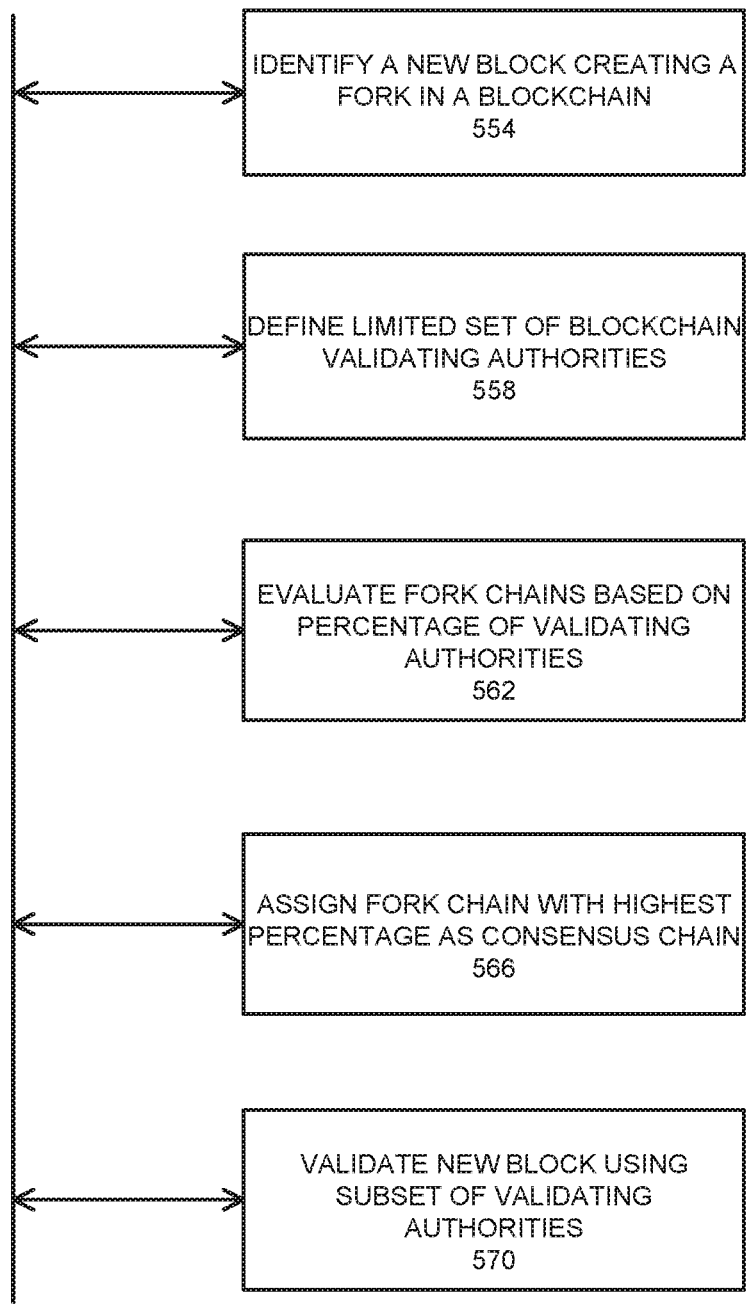
FIG. 5B illustrates a flow diagram of an example method of resolving fork chain validation in a blockchain, according to example embodiments.

FIG. 5B illustrates a flow diagram 550 of an example method of resolving fork chain validation in a blockchain, according to example embodiments. Referring to FIG. 5B, the method 550 may also include one or more of the following steps.

At block 554, the blockchain network identifies a new block creating a fork in a blockchain. A user of a consensus software application will typically be warned when an application must choose between multiple valid transactions histories or fork chains. This is because the presence of a forked block chain can indicate an intentional attempt by other users to alter the transaction history for the purpose of double spending.

At block 558, the blockchain network defines a limited set of blockchain validation authorities. A limited set of blockchain validating authorities (VAs) are defined for each block at the time the block is produced and these validating authorities are used to disambiguate any forks originating at that block.

At block 562, the blockchain network evaluates fork chains based on a percentage of validating authorities. Each validating authority within a set of validating authorities can be understood to account for a specified percentage of the combined authority of the full validating authority set. Fork chains are evaluated by the percentage of the validating authorities that has acknowledged each fork chain.

At block 566, the blockchain network assigns a fork chain having a highest percentage as the consensus chain. The percentage of validation authority acknowledgement can be called the width of the fork chain. The fork chain with the highest percent acknowledgment is considered the widest chain and is accepted as the consensus chain (assuming the chain follows all other consensus rules). When evaluating a fork and a particular authority has signed a fork chain, signing the same fork chain again with the same authority does not increase the width.

At block 570, the blockchain network validates the new block using a subset of the validating authorities. The validating authority list can be small, such as a small group of highest ranked elected block signers. A small validating authority list will be quicker to check when comparing forks and quicker to confirm changes to the ledger, resulting in faster transaction/block validation.

Figure 6A:
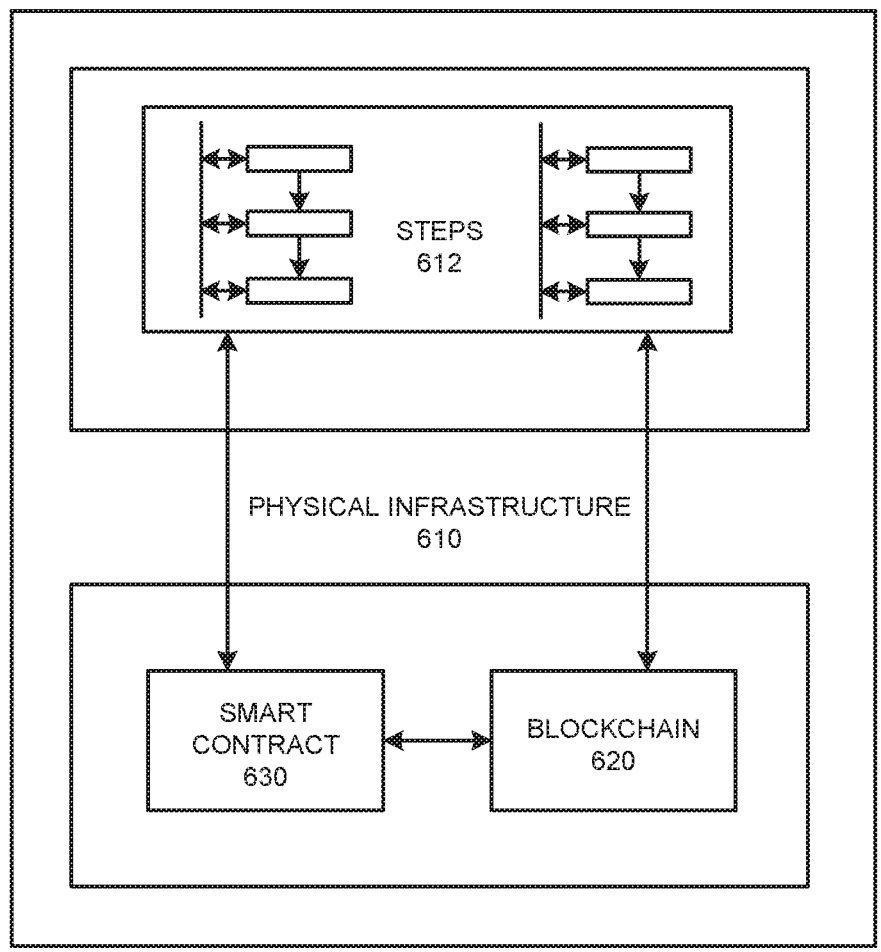
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
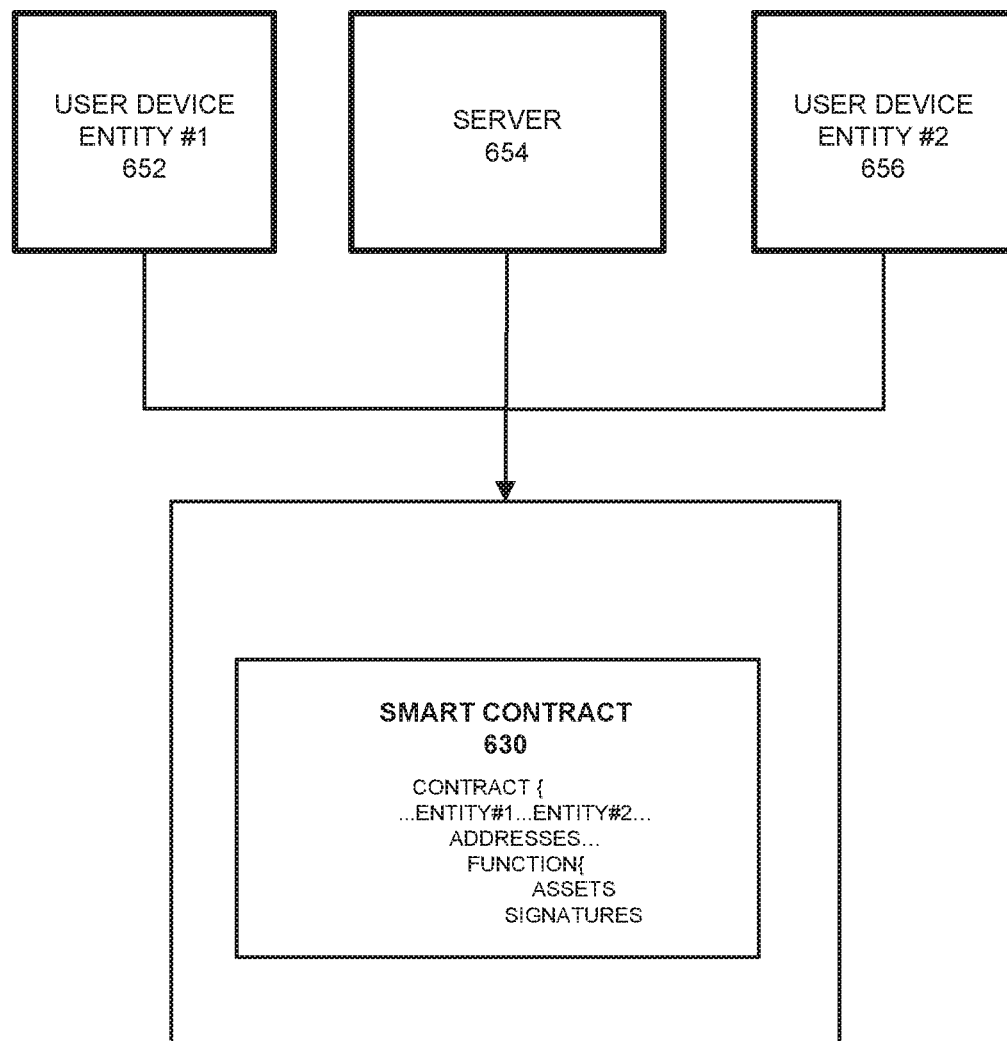
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656, which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
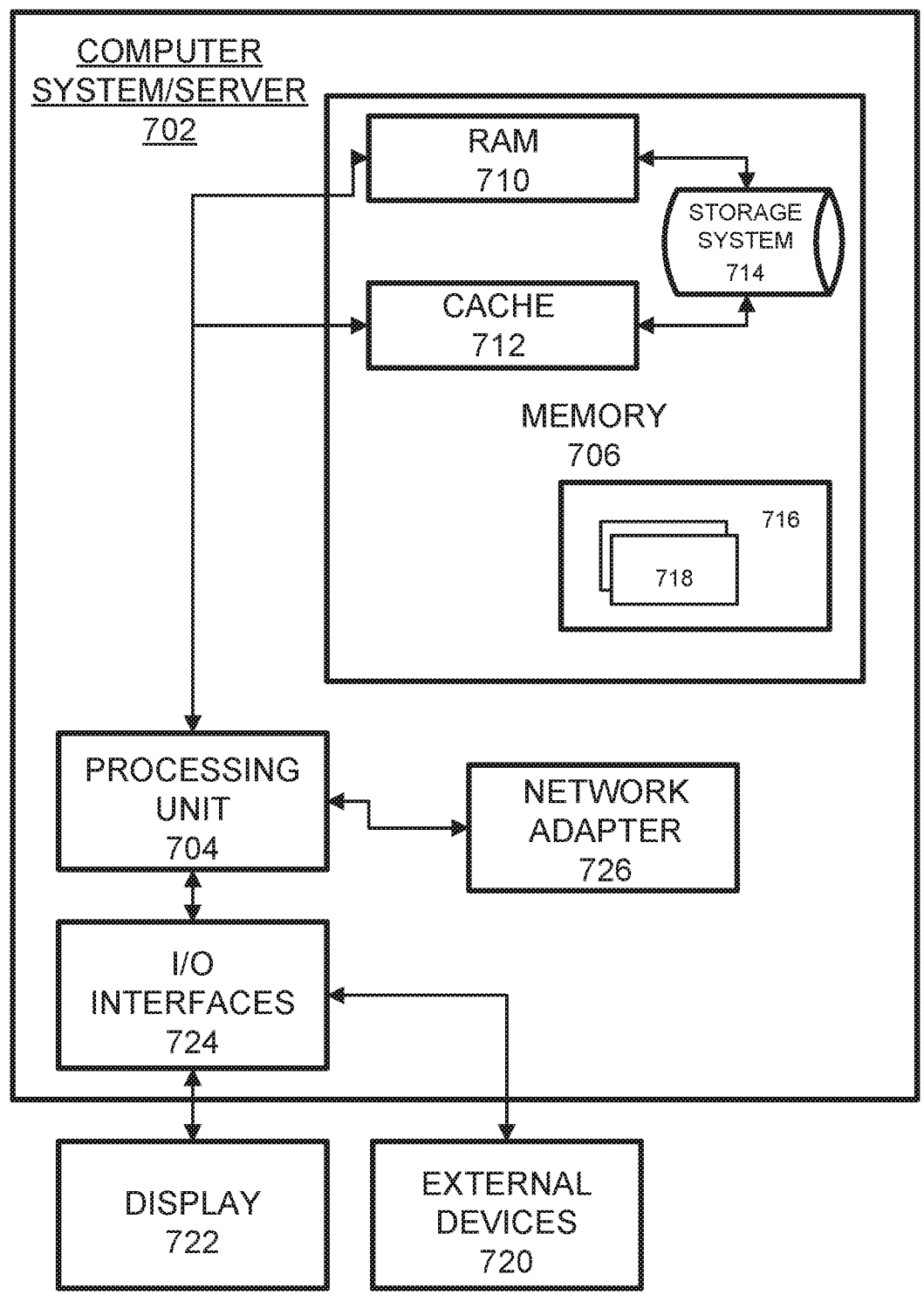
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    creating, by a blockchain node, a validation database in a memory, the validation database comprising state data corresponding to a number of most recent blocks recorded in a ledger of a blockchain, the state data in the validation database derived from a portion of a state database for the blockchain;
    simulating each of one or more transactions, wherein the simulating comprises determining a height of the blockchain for each simulated transaction, the height of the blockchain corresponding to the number of most recent blocks in the blockchain at a simulation time, and setting a simulation height as the height of the blockchain;
    determining that each transaction in a new block may be validated based on the state data in the validation database;
    validating each transaction in the new block based on the state data in the validation database and results of the simulation;
    adding a new state to the state database when the new block is committed to the blockchain, updating the validation database to correspond to the new state added to the state database, and adjusting a height of the validation database,
    wherein the height of the validation database comprises a minimum height which is a height of an oldest block having data available in the validation database, and wherein determining that each transaction in the new block may be validated based on the state data in the validation database includes verifying the simulation height of each transaction is greater than or equal to the minimum height.

2. The method of claim 1, wherein creating the validation database comprising:
    determining the number of most recent blocks corresponding to the state data in the validation database; and
    migrating state information of the number of most recent blocks of the blockchain from the state database to a higher performing storage medium.

3. The method of claim 1, wherein the method further comprises one or more of:
    intercepting one or more queries to the state database for each of the one or more simulated transactions;
    obtaining one or more data versions, in response to the one or more queries; and
    selecting a maximum data version of the one or more data versions as the simulation height.

4. The method of claim 3, further comprising committing the new block to the blockchain comprising:
    applying writes for valid transactions in the new block to the validation database and the state database;
    deleting data corresponding to an oldest block of the validation database; and
    adjusting the minimum height to reflect the blocks corresponding to the data maintained in the validation database.

5. The method of claim 4, further comprising:
    identifying phantom items in the state database for transactions being validated by performing validation against the validation database; and
    recording transactions as invalid in response to identifying one or more phantom items for the transactions.

6. The method of claim 4, wherein validating each transaction in the new block comprises:
    recording an identification of a state database snapshot during a transaction simulation phase; and
    detecting if there are differences in the state database between the transaction simulation phase and a later transaction validation phase.

7. A system, comprising:
    a blockchain network, which comprises:
    one or more blockchain nodes that validate blockchain transactions, each comprises:
    a processor; and
    a memory device, coupled to the processor, which comprises a validation database, which comprises state data that corresponds to a number of most recent blocks recorded in a ledger of a blockchain; wherein the processor is configured to:
        simulate each of one or more transactions, wherein the processor determines a height of the blockchain for each simulated transaction, the height of the blockchain corresponding to the number of most recent blocks in the blockchain at a simulation time, and sets a simulation height as the height of the blockchain;

determine that each transaction in a new block may be validated based on the state data based on the validation database;

validate each transaction in the new block based on the state data in the validation database and results of the simulation; and add a new state to the state database when the new block is committed to the blockchain, update the validation database to correspond to the new state added to the state database, and adjust a height of the validation database wherein the height of the validation database comprises a minimum height which is a height of an oldest block having data available in the validation database, and the processor determines that each transaction in the new block may be validated by verifying the simulation height of each transaction is greater than or equal to the minimum height.

8. The system of claim 7, wherein the validation database comprises a higher performance storage medium than a state database, and wherein the state database stores data that corresponds to all blocks in the blockchain.

9. The system of claim 8, wherein the processor is further configured to one or more of:
intercept one or more queries to the state database for each simulated transaction;
obtain one or more data versions, in response to the one or more queries; and
select a maximum data version of the one or more data versions as the simulation height.

10. The system of claim 9, wherein the processor is configured to commit the new block to the blockchain, and the processor is further configured to:
apply writes for valid transactions in the new block to the validation database and the state database;
delete data that corresponds to an oldest block of the validation database; and
adjust the minimum height to reflect the blocks that correspond to the data maintained in the validation database.

11. The system of claim 10, wherein the processor is further configured to:
identify phantom items in the state database while transactions are validated against the validation database; and
record transactions as invalid in response to the processor identifies one or more phantom items for the transactions.

12. The system of claim 10, wherein the processor is further configured to:
record an identification of a state database snapshot while one or more transactions are simulated; and
detect if there are differences in the state database between the transaction simulation phase and a later transaction validation phase.

13. A non-transitory computer readable medium comprising instructions, that when read by a processor, cause the processor to perform a method comprising:
creating, by a blockchain node, a validation database in a memory, the validation database comprising state data corresponding to a number of most recent blocks recorded in a ledger of a blockchain, the state data in the validation database derived from a portion of a state database for the blockchain;
simulating each of one or more transactions, wherein the simulating comprises determining a height of the blockchain for each simulated transaction, the height of the blockchain corresponding to the number of most recent blocks in the blockchain at a simulation time, and setting a simulation height as the height of the blockchain;
determining that each transaction in a new block may be validated based on the state data in the validation database;
validating each transaction in the new block based on the state data in the validation database and results of the simulation; and
adding a new state to the state database when the new block is committed to the blockchain, updating the validation database to correspond to the new state added to the state database, and adjusting a height of the validation database
wherein the height of the validation database comprises a minimum height which is a height of an oldest block having data available in the validation database, and wherein determining that each transaction in the new block may be validated based on the state data in the validation database includes verifying the simulation height of each transaction is greater than or equal to the minimum height.

14. The non-transitory computer readable medium of claim 13, wherein creating the validation database comprising:
determining the number of most recent blocks corresponding to the state data in the validation database; and
migrating state information of the number of most recent blocks of the blockchain from the state database to a higher performing storage medium.

15. The non-transitory computer readable medium of claim 13, wherein the method further comprises one or more of:
intercepting one or more queries to the state database for each simulated transaction;
obtaining one or more data versions, in response to the one or more queries; and
selecting a maximum data version of the one or more data versions as the simulation height.

16. The non-transitory computer readable medium of claim 15, further comprising committing the new block to the blockchain comprising:
applying writes for valid transactions in the new block to the validation database and the state database;
deleting data corresponding to an oldest block of the validation database; and
adjusting the minimum height to reflect the blocks corresponding to the data maintained in the validation database.

17. The non-transitory computer readable medium of claim 16, wherein validating each transaction in the new block comprises:
recording an identification of a state database snapshot during a transaction simulation phase; and
detecting if there are differences in the state database between the transaction simulation phase and a later transaction validation phase.

* * * * *